United States Patent
Miyauchi et al.

(10) Patent No.: US 8,339,442 B2
(45) Date of Patent: Dec. 25, 2012

(54) IMAGE CONVERSION METHOD AND IMAGE CONVERSION APPARATUS

(75) Inventors: Shingo Miyauchi, Osaka (JP); Yoshihito Ohta, Okayama (JP)

(73) Assignee: Panasonic Corporation, Osaka (JP)

( * ) Notice: Subject to any disclaimer, the term of this patent is extended or adjusted under 35 U.S.C. 154(b) by 449 days.

(21) Appl. No.: 12/777,371

(22) Filed: May 11, 2010

(65) Prior Publication Data

US 2010/0289873 A1    Nov. 18, 2010

(30) Foreign Application Priority Data

May 12, 2009  (JP) ................. 2009-115398

(51) Int. Cl.
 *H04N 15/00* (2006.01)

(52) U.S. Cl. ............... 348/43; 348/46; 348/51; 348/47; 348/42; 352/62; 352/59; 352/64; 352/57

(58) Field of Classification Search ............. 348/43, 348/46, 51, 47, 42; 352/62, 59, 64, 57
See application file for complete search history.

(56) References Cited

U.S. PATENT DOCUMENTS 5,684,529 A * 11/1997 Yoshimi et al. ........... 348/43
5,929,859 A * 7/1999 Meijers ................... 345/419
7,319,436 B2 * 1/2008 Tomisawa ................ 345/6

FOREIGN PATENT DOCUMENTS

JP   2001-333391 A   11/2001
JP   2002-262310 A    9/2002

* cited by examiner

*Primary Examiner* — Shawn An
(74) *Attorney, Agent, or Firm* — RatnerPrestia

(57) ABSTRACT

An image conversion apparatus includes an image signal input unit repeatedly inputting an odd-numbered frame of a first parallax, an odd-numbered frame of a second parallax, an even-numbered frame of the first parallax, and an even-numbered frame of the second parallax, in this order; a frame memory storing the first and second parallax data having been input; a memory control unit alternately reading as field data (m+1) pieces (m is an integer of one or larger than one) of identical odd-numbered frames of the first parallax and m pieces of identical odd-numbered frames of the second parallax, and subsequently alternately reading as field data m pieces of identical even-numbered frames of the first parallax and (m+1) pieces of identical even-numbered frames of the second parallax; and an image output unit outputting the field data having been read.

12 Claims, 4 Drawing Sheets

IMAGE CONVERSION METHOD AND IMAGE CONVERSION APPARATUS

BACKGROUND OF THE INVENTION

1. Field of the Invention

The present invention relates to an image conversion method of smoothing image movement in three dimensional display (abbreviated as "3D solid display" hereinafter) that allows images recorded such as on a film to be viewed three-dimensionally and to an image conversion apparatus using the method.

2. Background Art

Conventionally, there is known a method of presenting different images for the right and left eyes as a method of providing images recorded such as on a film to be viewed three-dimensionally. When a person views an object, a visual difference (abbreviated as parallax hereinafter) occurs between the images seen by the right and left eyes. Owing to the parallax, a person perceives an object as its stereoscopic image and senses depth of the object. Hence, 3D solid display is available by creating and using two pieces of image data (abbreviated as "parallax data" hereinafter) reflecting the parallax between both right and left eyes. Parallax data is created through shooting an object with two cameras of the same type positioned at the right and left for the right and left eyes, respectively.

As a method of 3D solid display using parallax data with a display device, active shutter method is disclosed (refer to Japanese Patent Unexamined Publication No. 2002-262310, for instance). In the method, image signals for the right and left eyes are arranged in time series for display. Then, images for the right and left eyes are viewed by the right and left eyes, respectively, using shutter glasses that open and close the shutters of the lenses for the right and left eyes in accordance with the image for 3D solid display.

Meanwhile, the movies are receiving attention as image sources for 3D solid display and have been achieving widespread use in recent years. In most cases, an image is filmed at 24 Hz (24 frames per second) for recording. Hence, with conventional two-dimensional display, a method is disclosed (refer to Japanese Patent Unexamined Publication No. 2001-333391, for instance) that converts the frame rate of an image from 24 Hz to 60 Hz suitable for image display with the 3-2 pulldown process.

With the above conventional method, each frame of an image recorded on a movie film is displayed alternately between three times and twice, impressing a viewer with the image being timewise discontinuous (judders), which fails to provide a smoothly moving image.

SUMMARY OF THE INVENTION

An image conversion apparatus of the present invention displays a three-dimensional image owing to first and second parallax data that are two pieces of image data reflecting parallax between the right and left eyes. The image conversion apparatus includes a frame input unit, frame storage unit, and field output unit. The frame input unit repeatedly inputs an odd-numbered frame of first parallax data, an odd-numbered frame of second parallax data (paired with the odd-numbered frame of the first parallax data), an even-numbered frame of the first parallax data, and an even-numbered frame of the second parallax data (paired with the even-numbered frame of the first parallax data), in this order. The frame storage unit stores the odd- and even-numbered frames of first and second parallax data input from the frame input unit. The field output unit alternately outputs as field data (m+1) (m is an integer of one or larger than one) pieces of identical odd-numbered frames of the first parallax data, and m pieces of identical odd-numbered frames of the second parallax data (paired with the odd-numbered frames of the first parallax data), the frames stored in the frame storage unit. Subsequently, the field output unit alternately outputs as field data (m+1) pieces of identical even-numbered frames of the second parallax data, and m pieces of identical even-numbered frames of the first parallax data (paired with the even-numbered frames of the second parallax data), the frames stored in the frame storage unit.

According to such a configuration, field data is alternately output to control timing for changing a frame in 3D solid display, thereby making each frame length constant. This configuration suppresses jerky, rough image movement (judders) even in telecine-converting a 24-Hz image. Consequently, a viewer is not impressed with the image being jerky (i.e. timewise discontinuous), which provides a high-quality image conversion apparatus capable of smooth 3D solid display.

The image conversion method of the present invention includes a frame input step, frame storing step, and field output step. The frame input step repeatedly inputs an odd-numbered frame of first parallax data, an odd-numbered frame of second parallax data (paired with the odd-numbered frame of the first parallax data), an even-numbered frame of the first parallax data, and an even-numbered frame of the second parallax data (paired with the even-numbered frame of the first parallax data), in this order. The frame storing step stores the odd- and even-numbered frames of the first and second parallax data input in the frame input step. The field output step alternately outputs as field data (m+1) pieces of identical odd-numbered frames of the first parallax data, and m pieces of identical odd-numbered frames of the second parallax data (paired with the odd-numbered frames of the first parallax data), the frames stored in the frame storing step. Subsequently, the field output step alternately outputs as field data (m+1) pieces of identical even-numbered frames of the second parallax data, and m pieces of identical even-numbered frames of the first parallax data (paired with the even-numbered frames of the first parallax data), the frames stored in the frame storing step.

According to such a method, field data is alternately output to control timing for changing a frame in 3D solid display, thereby making each frame length constant. This configuration suppresses jerky, rough image movement (judders) even in telecine-converting a 24-Hz image. Consequently, a viewer is not impressed with the image being jerky (i.e. timewise discontinuous), which provides a high-quality image conversion method capable of smooth 3D solid display.

DETAILED DESCRIPTION OF PREFERRED EMBODIMENT EXEMPLARY EMBODIMENT

Hereinafter, a description is made of image conversion apparatus 15 and an image conversion method according to an embodiment of the present invention referring to FIGS. 1 through 7. Image conversion apparatus 15 displays a 3D solid image by means of a 3D image signal composed of left-eye image signal 20L (first parallax data) and right-eye image signal 20R (second parallax data) that are image data related to the parallax between both eyes of viewer 10.

Figure 1:
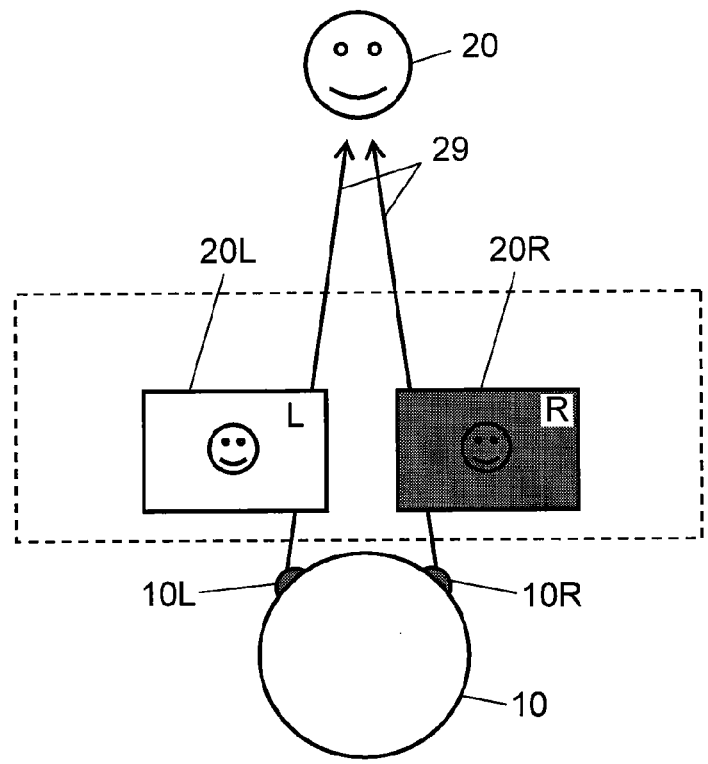
FIG. 1 is a conceptual diagram illustrating 3D solid display by an image conversion apparatus according to an embodiment of the present invention.

FIG. 1 is a conceptual diagram illustrating 3D solid display by image conversion apparatus 15 according to the embodiment of the present invention. In FIG. 1, when viewer 10 views object 20 with both eyes (left eye 10L and right eye 10R), the left- and right-eye images are projected on the retinas (not shown) of left eye 10L and right eye 10R, respectively. In this case, the direction in which object 20 is viewed is different with between left eye 10L and right eye 10R, which produces parallax between the left- and right-eye images. On such a principle, image data related to parallax between left eye 10L and right eye 10R of viewer 10 contained in left- and right-eye images allows viewer 10 to perceive object 20 on the basis of parallax image 29 from left- and right-eye images. Consequently, viewer 10 perceives object 20 as a three-dimensional solid image.

Image conversion apparatus 15 according to the embodiment telecine-converts a parallax image signal composed of two pieces of image data reflecting parallax between both right and left eyes. Examples of the two pieces of image data include a parallax image signal composed of left-eye image signal 20L and right-eye image signal 20R related to left- and right-eye images, respectively.

Figure 2:
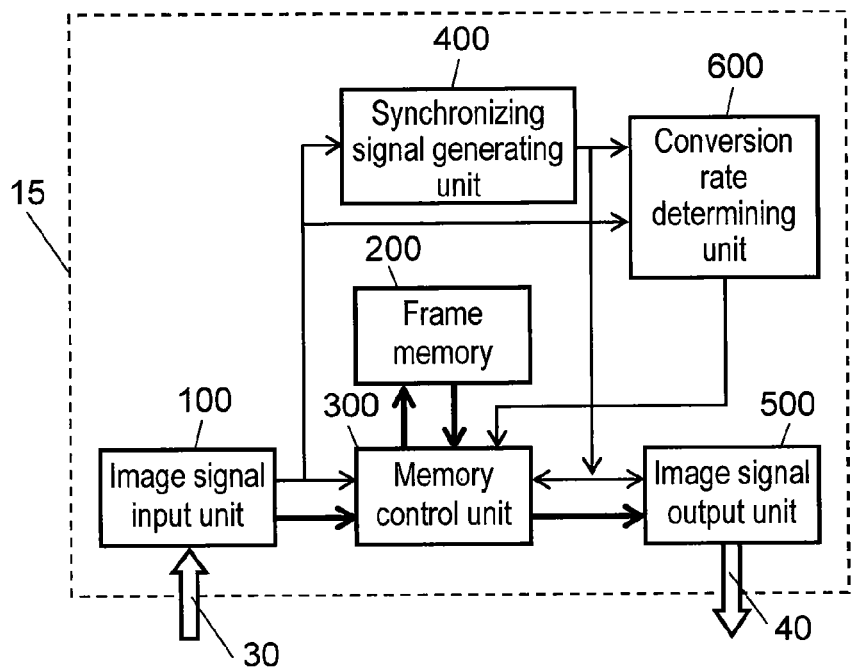
FIG. 2 is a block diagram showing a principal configuration of the apparatus.

FIG. 2 is a block diagram showing a principal configuration of image conversion apparatus 15 according to the embodiment of the present invention. A description is made of the basic configuration and an outline of the functions of apparatus 15.

As shown in FIG. 2, image conversion apparatus 15 includes image signal input unit 100, frame memory 200, memory control unit 300, synchronizing signal generating unit 400, image signal output unit 500, and conversion rate determining unit 600.

Image signal input unit 100 receives parallax image signal 30 and extracts left- and right-eye frames. Unit 100 outputs a vertical synchronizing signal contained in parallax image signal 30 to synchronizing signal generating unit 400 and conversion rate determining unit 600. Frame memory 200 stores frames extracted by image signal input unit 100.

Synchronizing signal generating unit 400 generates a vertical synchronizing signal (abbreviated as "output V signal" (second vertical synchronization frequency) hereinafter) for field data 40 output from image signal output unit 500, from a vertical synchronizing signal (abbreviated as "input V signal" (first vertical synchronization frequency) hereinafter) contained in parallax image signal 30 input from image signal input unit 100. Then, synchronizing signal generating unit 400 outputs the vertical synchronizing signal generated to memory control unit 300, image signal output unit 500, and conversion rate determining unit 600.

Conversion rate determining unit 600 determines conversion parameter m required for a frame rate conversion process performed by memory control unit 300, from input and output V signals. Then, conversion rate determining unit 600 outputs conversion parameter m required for a frame rate conversion process to memory control unit 300. How conversion parameter m is determined is described later.

Memory control unit 300 writes a frame input from image signal input unit 100 into frame memory 200. Memory control unit 300 controls reading of a frame, which is output to image signal output unit 500, from frame memory 200. Memory control unit 300 controls reading of a frame from frame memory 200 on the basis of conversion parameter m input from conversion rate determining unit 600 so that the number of output fields to an input frame becomes constant to perform a frame rate conversion process. Image signal output unit 500 outputs field data 40 having undergone a frame rate conversion process.

Figure 3:
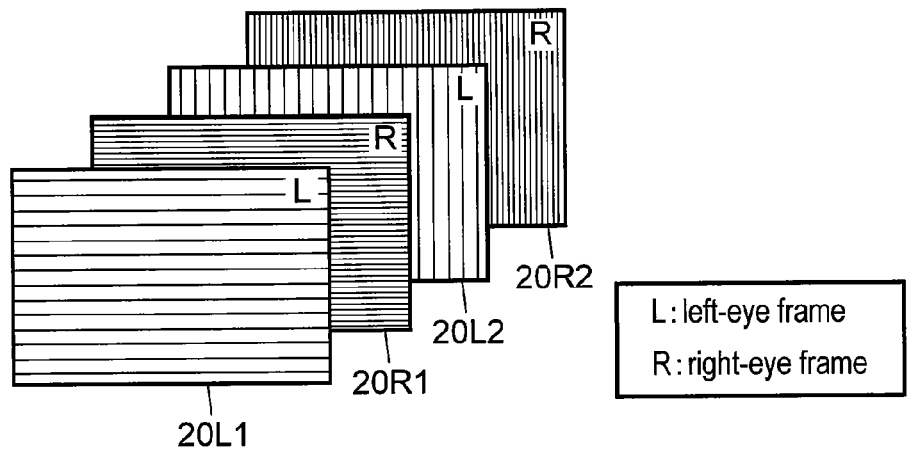
FIG. 3 is a conceptual diagram illustrating parallax image signals input to the apparatus.
Figure 4A:
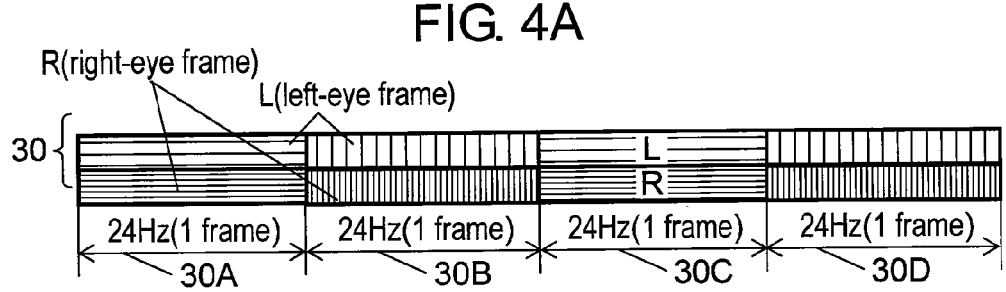
FIG. 4A is a conceptual diagram illustrating parallax image signals output from the apparatus.
Figure 4B:
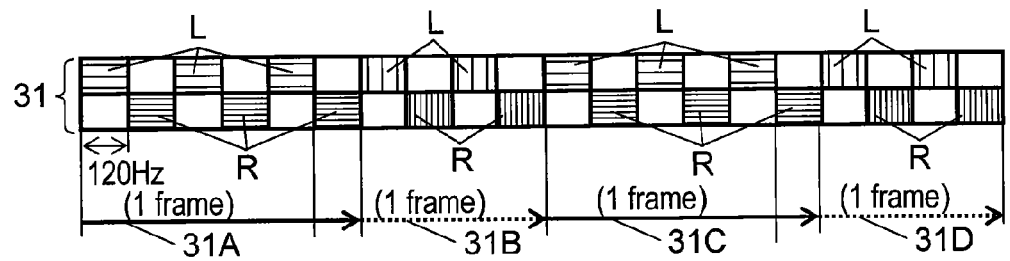
FIG. 4B is a conceptual diagram illustrating parallax image signals output from the apparatus.
Figure 4C:
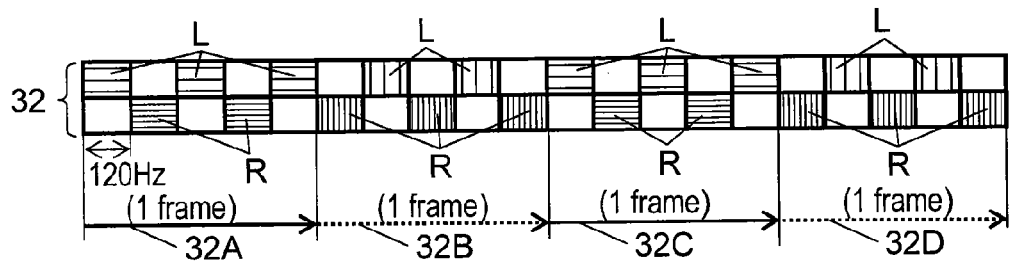
FIG. 4C is a conceptual diagram illustrating parallax image signals output from the apparatus.

Next, a description is made of a frame rate conversion process for parallax image signal 30 in image conversion apparatus 15 using FIGS. 3, 4A, 4B, and 4C. FIGS. 4A through 4C are conceptual diagrams respectively illustrating parallax image signals 30, 31, and 32 output from image conversion apparatus 15 according to the embodiment of the present invention.

As shown in FIGS. 3 and 4A, image conversion apparatus 15 alternately inputs 24-Hz (24 frames per second) parallax image signal 30 recorded on a movie film to image signal input unit 100 by frame sequential method as left-eye frame L (abbreviated as "L image" hereinafter) and right-eye frame R (abbreviated as "R image" hereinafter). In other words, frames are alternately input one by one (L image 30A, R image 30B, L image 30C, and R image 30D, as shown in FIG. 4A) from images (e.g. L image 20L1, R image 20R1, L image 20L2, and R image 20R2, shown in FIG. 3).

FIG. 4B shows parallax image signal 31 output when parallax image signal 30 input at a 24-Hz frame rate is converted to a 60-Hz frame rate (suitable for image display) by the 3-2 pulldown process conventionally known. In this case, frame 31A (a pair of L and R images, three times), frame 31B (a pair of L and R images, twice), frame 31C, and frame 31D are alternately displayed repeatedly for each frame of a 3D solid image. Hence, the length of each frame changes, which sometimes causes the image movement to be in a jerky, rough state (judders). Accordingly, this impresses the viewer with the image being jerky, namely timewise discontinuous.

Particularly in a case where a subject moves slowly in the screen, the image quality deteriorates prominently. For instance, if odd-numbered L and R images of parallax image signal 30 being input are horizontal stripes in black and white; and even-numbered, vertical stripes in black and white, the number of output field data for horizontal stripes is larger than that for vertical stripes with the above-described 3-2 pulldown process. Hence, images are to be output with their horizontal stripes emphasized.

Image conversion apparatus 15, on the other hand, controls field data 40 so that the length of each frame of parallax image signal 32 being output becomes the same in order to suppress judders resulting from a frame rate conversion process as shown in FIG. 4C. Specifically, as against parallax image signal 30, where one frame is composed of a pair (abbreviated as "LR pair" hereinafter) of 24-Hz L and R images, as parallax image signal 32, where one frame is composed of a pair of 120-Hz L and R images, frame 32A (composed of two LR pairs and one L image), frame 32B (composed of two LR pairs and one R image), frame 32C (composed in the same way), and frame 32D (composed in the same way) are alternately output repeatedly.

According to this method, the length of each frame of parallax image signal 32 being output does not change, and thus the image movement does not become a jerky, rough state (judders). Accordingly, this does not impress the viewer with the image being jerky, namely timewise discontinuous. According to the image conversion method of image conversion apparatus 15, an image is output that impresses the viewer with a nearly equal strength of horizontal and vertical stripes even for parallax image signal 30 composed of horizontal and vertical stripes in black and white shown in FIG. 4A, for instance.

Figure 5A:
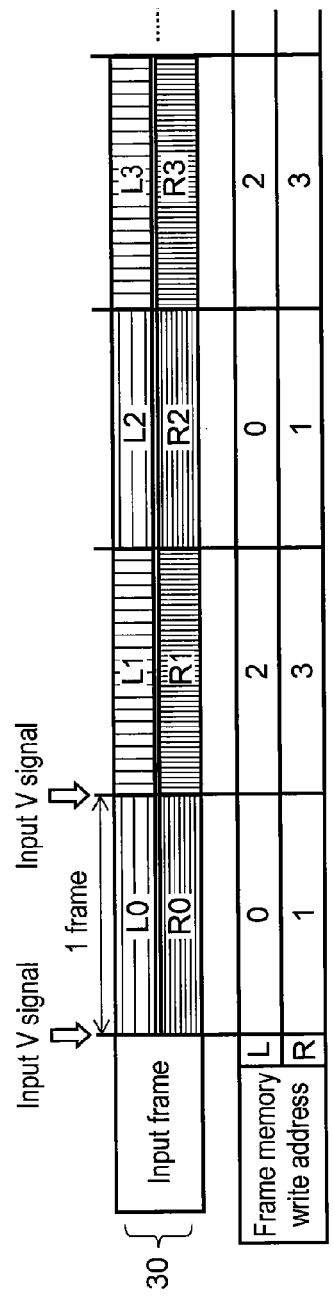
FIG. 5A is a conceptual diagram illustrating a frame rate conversion process in the embodiment.
Figure 5B:
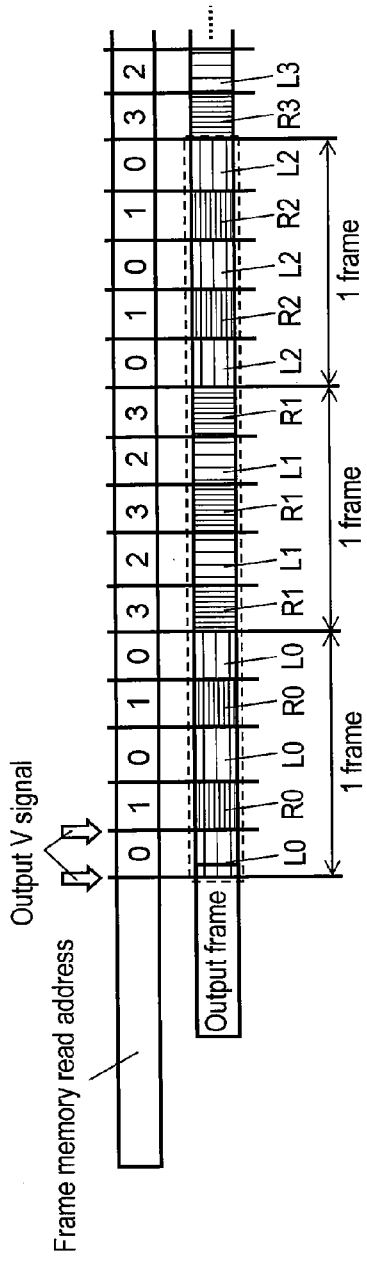
FIG. 5B is a conceptual diagram illustrating a frame rate conversion process in the embodiment.

Next, a description is made of the frame rate conversion process of image conversion apparatus 15 using FIGS. 5A and 5B. FIGS. 5A and 5B are conceptual diagrams illustrating the frame rate conversion process according to the embodiment of the present invention.

Image conversion apparatus 15 inputs parallax image signal 30 of 24 frames/second shown in FIG. 5A, recorded on a movie film for instance. Parallax image signal 30 having been input contains two pieces of parallax data corresponding to L images (L0, L1, L2, L3, etc.) and R images (R0, R1, R2, R3, etc.).

Image signal input unit 100 sequentially extracts an odd-numbered frame (e.g. L0) of an L image, an odd-numbered frame (e.g. R0) of an R image (paired with the odd-numbered frame of the L image), an even-numbered frame (e.g. L1) of the L image, and an even-numbered frame (e.g. R1) of the R image (paired with the even-numbered frame of the R image). Then, image signal input unit 100 outputs each frame extracted to memory control unit 300. Further, image signal input unit 100 outputs a 24-Hz input V signal contained in parallax image signal 30 having been input to memory control unit 300 and synchronizing signal generating unit 400. Then, image signal input unit 100 performs the same process on the following L and R images (L2 and R2, L3 and R3, etc.).

In other words, image signal input unit 100 as a frame input unit repeatedly inputs an odd-numbered frame of first parallax data, an odd-numbered frame of second parallax data (paired with the odd-numbered frame of the first parallax data), an even-numbered frame of the first parallax data, and an even-numbered frame of the second parallax data (paired with the even-numbered frame of the first parallax data), in this order. Here, in this embodiment, either of the following two cases is accepted. One is the case where first parallax data is left-eye parallax data; and second parallax data is right-eye parallax data. The other is the case where first parallax data is right-eye parallax data; and second parallax data is left-eye parallax data.

Synchronizing signal generating unit 400 detects an input V signal output from image signal input unit 100. Then, synchronizing signal generating unit 400 generates an output V signal of field data 40 output from image signal output unit 500. An output V signal is 120 Hz. Synchronizing signal generating unit 400 outputs an output V signal to memory control unit 300, image signal output unit 500, and conversion rate determining unit 600.

Figure 6:
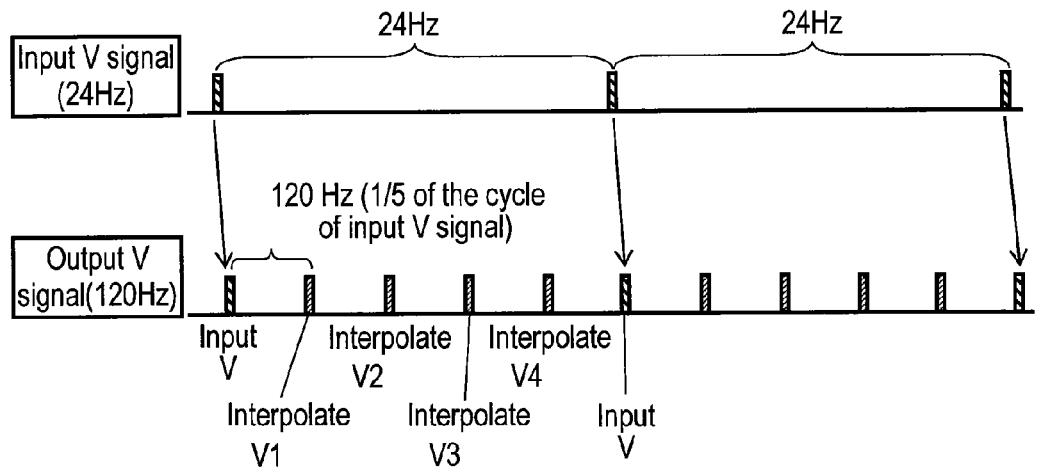
FIG. 6 is a conceptual diagram illustrating synchronizing signal generation in the embodiment.

FIG. 6 is a conceptual diagram illustrating synchronizing signal generation according to the embodiment of the present invention. In FIG. 6, the upper waveform shows an input V signal; the lower waveform shows an output V signal. As shown in FIG. 6, synchronizing signal generating unit 400 interpolates V signals between 24-Hz input V signals four times at an interval of ⅕ of the cycle of the input V signal to generate a 120-Hz (multiplied by 5) output V signal.

Conversion rate determining unit 600 determines conversion parameter m as 2 from input and output V signals, and outputs the value to memory control unit 300. Here, conversion parameter m is assumed to be given by a function of two variables (given values of input and output V signals) or a conversion table. Examples of such a function include one that divides the frequency (120 Hz in this embodiment) of an output V signal by the frequency (24 Hz in this embodiment) of an input V signal, multiplies the resulting value by ½, and omits the figures after the decimal fractions to make an integer, which results in conversion parameter m. In this embodiment, conversion parameter m is 2; however, the present invention is applicable as long as conversion parameter m is an integer of one or larger than one.

Frame memory 200 as a frame storage unit is a memory storing odd- and even-numbered frames of L and R images extracted by image signal input unit 100.

Memory control unit 300 controls writing of L and R images input from image signal input unit 100 into frame memory 200 synchronously with a 24-Hz input V signal input from unit 100. Meanwhile, memory control unit 300 reads L and R images from memory 200 synchronously with a 120-Hz output V signal input from synchronizing signal generating unit 400, and outputs the images to image signal output unit 500.

In further detail, memory control unit 300 writes an odd-numbered frame of L and R images to a pair of addresses (4n+0, 4n+1) of frame memory 200, synchronously with an input V signal as shown in FIG. 5A, for L and R images output from image signal input unit 100. In the same way, memory control unit 300 writes an even-numbered frame of L and R images to a pair of addresses (4n+2, 4n+3) (n is an integer of zero or larger than zero).

Further, in order to restrain judders from occurring, memory control unit 300 performs a frame rate conversion process on the basis of conversion parameter m (e.g. m=2 in this embodiment) input from conversion rate determining unit 600. Specifically, as shown in FIG. 5B, memory control unit 300 reads an L image and its corresponding R image alternately twice each and an additional L image from addresses (4n+0, 4n+1) of frame memory 200 synchronously with an output V signal, and outputs the images to image signal output unit 500. After that, memory control unit 300 reads an R image and its corresponding L image alternately twice each and an additional R image from addresses (4n+2, 4n+3) of frame memory 200, and outputs the images to image signal output unit 500.

Image signal output unit 500 outputs L and R images output from memory control unit 300 as field data 40 synchronously with an output V signal input from synchronizing signal generating unit 400.

In other words, image signal output unit 500 as a field output unit alternately outputs as field data 40 (m+1) pieces of identical odd-numbered frames of the first parallax data, and m pieces of identical odd-numbered frames of the second parallax data (paired with the odd-numbered frames of the first parallax data), the frames stored in frame memory 200. Subsequently, image signal output unit 500 alternately outputs as field data 40 (m+1) pieces of identical even-numbered frames of the second parallax data, and m pieces of identical even-numbered frames of the first parallax data (paired with the even-numbered frames of the second parallax data), the frames stored in frame memory 200.

Figure 7:
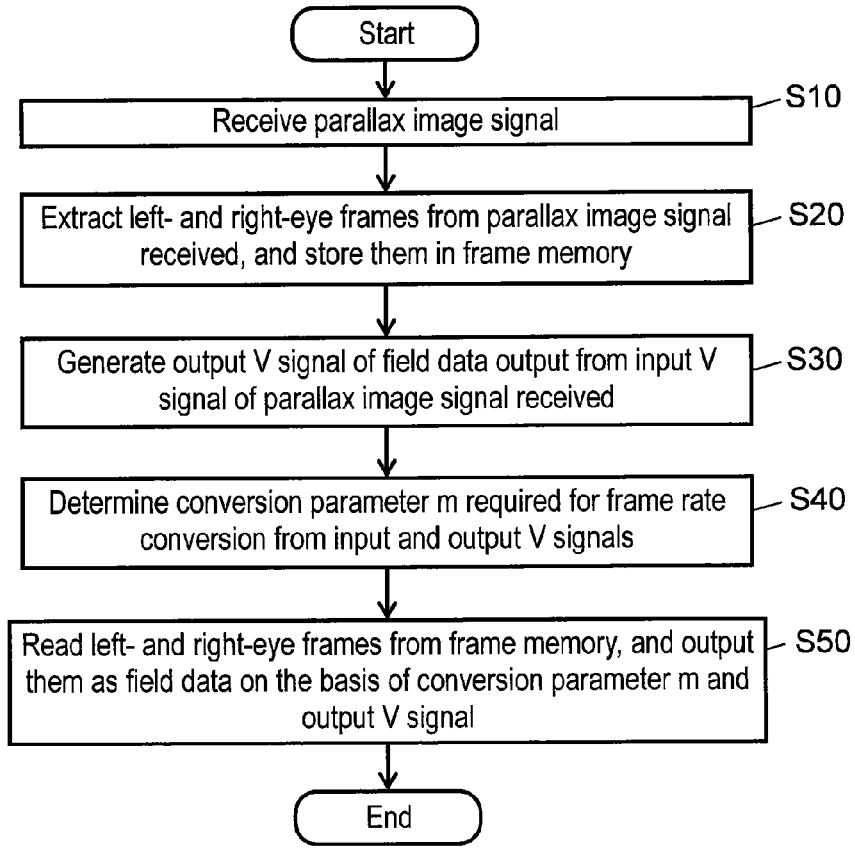
FIG. 7 is a flowchart of the frame rate conversion process in the embodiment.

Next, a description is made of the procedure of a frame rate conversion process of image conversion apparatus 15, described using FIG. 6. FIG. 7 is a flowchart of a frame rate conversion process according to the embodiment of the present invention. A detailed description is made of the frame rate conversion process using the flowchart of FIG. 7.

When image conversion apparatus 15 starts its operation, image signal input unit 100 first inputs parallax image signal 30 (step S10). As described above, step S10 is a frame input step, which repeatedly inputs an odd-numbered frame of first parallax data, an odd-numbered frame of second parallax data (paired with the odd-numbered frame of the first parallax data), an even-numbered frame of the first parallax data, and an even-numbered frame of the second parallax data (paired with the even-numbered frame of the first parallax data), in this order.

Next, image signal input unit 100 sequentially extracts an odd-numbered frame of an L image, an odd-numbered frame of an R image (paired with the odd-numbered frame of the L image), an even-numbered frame of the L image, and an even-numbered frame of the R image (paired with the even-numbered frame of the L image) from parallax image signal 30 having been input, and writes them to frame memory 200 (step S20). Step S20 is a frame storing step, which stores the odd- and even-numbered frames of the first and second parallax data input in the frame input step.

Next, synchronizing signal generating unit 400 generates an output V signal from an input V signal (step S30).

Then, conversion parameter m required in the frame rate conversion process is determined from input and output V signals (step S40).

Finally, memory control unit 300 alternately reads as field data 40 (m+1) pieces of identical odd-numbered frames of an L image and m pieces of identical odd-numbered frames of an R image (paired with the odd-numbered frames of the L image), stored in frame memory 200, on the basis of conversion parameter m and an output V signal. Subsequently, memory control unit 300 alternately reads as field data 40 (m+1) pieces of identical even-numbered frames of the R image and m pieces of identical even-numbered frames of the L image (paired with the even-numbered frames of the R image). Next, memory control unit 300 outputs field data 40 having been read to image signal output unit 500. Then, image signal output unit 500 outputs the data as field data 40 (step S50).

Step S50 is a field output step that alternately outputs as field data 40 (m+1) pieces of identical odd-numbered frames of first parallax data and m pieces of identical odd-numbered frames of second parallax data (paired with the odd-numbered frames of the first parallax data), stored in the frame storing step. Subsequently, step S50 alternately outputs as field data 40 (m+1) pieces of identical even-numbered frames of the second parallax data and m pieces of identical even-numbered frames of the first parallax data (paired with the even-numbered frames of the first parallax data), stored in the frame storage unit.

In this embodiment, conversion rate determining unit 600 determines conversion parameter m required for the frame rate conversion process on the basis of input and output V signals, and outputs the parameter to memory control unit 300. In other words, conversion rate determining unit 600 detects the first vertical synchronization frequency of a frame input from the frame input unit, and determines conversion parameter m from the first vertical synchronization frequency detected and the second vertical synchronization frequency of a field output from image signal output unit 500 as a field output unit. Then, the frame rate conversion process is performed on the basis of conversion parameter m input by memory control unit 300.

However, if input and output V signals are determined in a fixed manner, memory control unit 300 in itself can have conversion parameter m required for a frame rate conversion process as a fixed parameter, in which case conversion rate determining unit 600 is unnecessary.

In this embodiment, the present invention is applicable for even-numbered conversion parameter m. In this case, image signal output unit 500 is to output a parallax image signal containing frames of the same number of pairs of L and R images. Hence, image conversion apparatus 15 according to the embodiment displays a smoother 3D solid image.

What is claimed is:
1. An image conversion apparatus comprising:
a frame input unit;
a frame storage unit; and
a field output unit,
wherein the frame input unit repeatedly inputs:
an odd-numbered frame of first parallax data;
an odd-numbered frame of second parallax data paired with the odd-numbered frame of the first parallax data;
an even-numbered frame of the first parallax data; and
an even-numbered frame of the second parallax data paired with the even-numbered frame of the first parallax data,
in the order,
wherein the frame storage unit stores the odd- and even-numbered frames of the first and the second parallax data input from the frame input unit, and
wherein the field output unit alternately outputs as field data:
(m+1) pieces of identical odd-numbered frames of the first parallax data (m is an integer of one or larger than one); and
m pieces of identical odd-numbered frames of the second parallax data paired with the odd-numbered frames of the first parallax data,
the frames stored in the frame storage unit, and subsequently the field output unit outputs:
(m+1) pieces of identical even-numbered frames of the second parallax data; and
m pieces of identical even-numbered frames of the first parallax data paired with the even-numbered frames of the second parallax data,
the frames stored in the frame storage unit.

2. The image conversion apparatus of claim 1,
wherein
the first parallax data is for a left eye and the second parallax data is for a right eye, or
the first parallax data is for a right eye and the second parallax data is for a left eye.

3. The image conversion apparatus of claim 2, further comprising a conversion rate determining unit,
wherein the conversion rate determining unit detects a first vertical synchronization frequency of a frame input from the frame input unit and determines the m from the first vertical synchronization frequency detected and a second vertical synchronization frequency of a field output from the field output unit.

4. The image conversion apparatus of claim 2, wherein the m is an even number.

5. The image conversion apparatus of claim 1, further comprising a conversion rate determining unit,
wherein the conversion rate determining unit detects a first vertical synchronization frequency of a frame input from the frame input unit and determines the m from the first vertical synchronization frequency detected and a second vertical synchronization frequency of a field output from the field output unit.

6. The image conversion apparatus of claim 1, wherein the m is an even number.

7. An image conversion method comprising:
a frame inputting step repeatedly inputting:
- an odd-numbered frame of first parallax data;
- an odd-numbered frame of second parallax data paired with the odd-numbered frame of the first parallax data;
- an even-numbered frame of the first parallax data; and
- an even-numbered frame of the second parallax data paired with the even-numbered frame of the first parallax data, in the order;

a frame storing step storing the odd- and even-numbered frames of the first and the second parallax data having been input in the frame input step; and a field outputting step alternately outputting as field data:
- (m+1) pieces of identical odd-numbered frames of the first parallax data (m is an integer of one or larger than one); and
- m pieces of identical odd-numbered frames of the second parallax data paired with the odd-numbered frames of the first parallax data, the frames stored in the frame storing step, and subsequently the field outputting step alternately outputs as field data:
- (m+1) pieces of identical even-numbered frames of the second parallax data; and
- m pieces of identical even-numbered frames of the first parallax data paired with the even-numbered frames of the first parallax data, the frames stored in the frame storing step.

8. The image conversion method of claim 7, wherein
the first parallax data is for a left eye and the second parallax data is for a right eye, or
the first parallax data is for a right eye and the second parallax data is for a left eye.

9. The image conversion method of claim 8, further comprising a conversion rate determining step detecting a first vertical synchronization frequency of a frame input in the frame inputting step and determining the m from the first vertical synchronization frequency detected and a second vertical synchronization frequency of a field output in the field outputting step.

10. The image conversion method of claim 8, wherein the m is an even number.

11. The image conversion method of claim 7, further comprising a conversion rate determining step detecting a first vertical synchronization frequency of a frame input in the frame inputting step and determining the m from the first vertical synchronization frequency detected and a second vertical synchronization frequency of a field output in the field outputting step.

12. The image conversion method of claim 7, wherein the m is an even number.

* * * * *